United States Patent [19]
Del Pino et al.

[11] Patent Number: 6,036,149
[45] Date of Patent: Mar. 14, 2000

[54] HANGER FOR GYPSUM BOARD BY COMPRESSION

[75] Inventors: Gilberto Del Pino, deceased, late of Santurce; by Yolanda Elizondo Morales, administrator, Bayamon, both of Puerto Rico

[73] Assignee: Gilberto Del Pino, deceased, late of Santurce, Puerto Rico

[21] Appl. No.: 09/002,374

[22] Filed: Jan. 2, 1998

[51] Int. Cl.$^7$ ............................. A47F 5/08; A47G 1/16; F16B 21/00

[52] U.S. Cl. .................. 248/231.91; 248/216.1; 248/497; 411/340

[58] Field of Search ................ 248/493, 487, 248/475.1, 479, 484, 213.1, 216.4, 217.1, 218.3, 220.21, 220.22, 221.11, 221.12, 222.14, 222.51, 222.52, 223.31, 222.41, 223.21, 225.11, 225.21, 229.13, 229.23, 546, 547, 216.1, 217.4, 231.91, 220.31; 411/340, 341, 344, 345

[56] References Cited

U.S. PATENT DOCUMENTS

| | | | |
|---|---|---|---|
| 231,334 | 8/1880 | Kraus | 411/340 |
| 862,310 | 8/1907 | Cook | 411/340 |
| 1,352,919 | 9/1920 | Mahoney | 411/340 |
| 2,610,013 | 9/1952 | Gibson | 248/231.91 |
| 2,916,235 | 12/1959 | Nagel | 248/497 |
| 3,268,195 | 8/1966 | Hoffman | 248/225 |
| 3,547,389 | 12/1970 | Mitchell | 248/220.5 |
| 3,605,547 | 9/1971 | Millet | 411/344 |
| 3,897,035 | 7/1975 | Solo et al. | 248/217 |
| 3,917,323 | 11/1975 | Morgan | 285/189 |
| 3,929,311 | 12/1975 | Solo | 248/217 |
| 4,432,683 | 2/1984 | Polos | 411/340 |
| 4,482,121 | 11/1984 | Fink | 248/489 |
| 4,508,479 | 4/1985 | Mez | 411/340 |
| 4,858,871 | 8/1989 | Romano | 248/339 |
| 4,997,327 | 3/1991 | Cira | 411/340 |
| 5,028,030 | 7/1991 | Lewis | 248/493 |
| 5,069,412 | 12/1991 | Jacob | 248/493 |
| 5,110,247 | 5/1992 | Losada | 411/441 |
| 5,147,166 | 9/1992 | Harker | 411/29 |
| 5,209,621 | 5/1993 | Burbridge | 411/340 |
| 5,328,139 | 7/1994 | Barnes | 248/475.1 |
| 5,417,531 | 5/1995 | Brown | 411/344 |
| 5,449,139 | 9/1995 | Herelier et al. | 248/300 |
| 5,588,629 | 12/1996 | Barnes | 248/475.1 |
| 5,716,179 | 2/1998 | Smith | 411/342 |

FOREIGN PATENT DOCUMENTS 3502 436 A1  7/1986  Germany.

*Primary Examiner*—Derek J. Berger
*Assistant Examiner*—Michael Nornberg
*Attorney, Agent, or Firm*—Sixbey, Friedman, Leedom & Ferguson; David S. Safran

[57] ABSTRACT

A hanger which accommodates walls made of gypsum boards of varying thickness while allowing heavy items to be hung from the hanger. The hanger features a front plate, a backing plate and a hanger-screw. The item to be hung being suspended from the hanger-screw. The hanger is inserted into a perforation or hanger opening in the gypsum board. The hanger is introduced into the hanger hole so as to allow the backing plate to rotate about the hook of the front plate. The front plate is then pulled toward the user until the backing plate contacts a back wall of the gypsum board. The front plate is then bent in a direction so as to be substantially parallel to the backing plate and the gypsum board and so that complementary attachment holes in the backing plate and the front plate align so that the hanger-screw can engage both sets of holes. The hanger-screw is engaged into the backing plate and front plate and the gypsum board up until the stop portion of the hanger-screw abuts the front plate. The hanger-screw is then rotated so as to create a state of compression between the backing plate, the gypsum board and the front plate. Thus, when an item is hung on the hanger the load of the item is spread over a relatively large area of the gypsum board. Such a hanger prevents the gypsum board from breaking up, chipping, and tearing out when a heavy object is hung from the hanger.

15 Claims, 2 Drawing Sheets

HANGER FOR GYPSUM BOARD BY COMPRESSION

BACKGROUND OF THE INVENTION

1. Field of the Invention

This invention concerns a hanger to be mounted on a wall so as to hang an object. The invention more particularly concerns a hanger which attaches to a wall made of gypsum board by way of compressing the gypsum board.

2. Discussion of the Background

Walls constructed of gypsum board are unable to support an article of an appreciable weight hanging therefrom. Gypsum board tends to crumble and fall apart when a fastener such as a screw is introduced through the board. The hole accommodating the screw in the gypsum board tends to be ill-fitting and the screw is incapable of supporting an item of appreciable weight.

Other hanging methods such as adhesive tabs incorporating a hook may result in a local tear-out of a portion of the gypsum board. Still other devices require preworking of the gypsum board and assembly of associated hardware. The prework being involved and the associated hardware being of rather complex shapes. Furthermore, the hardware employed is specific to the thickness of the associated gypsum board in which it will be assembled.

Thus, there is a need for a simple to use gypsum board hanger that is easy to install and which accommodates gypsum board walls of varying thickness.

SUMMARY OF THE INVENTION

It is an object of the invention to provide a hanger for use with gypsum boards of varying thickness. The new hanger for gypsum board walls can be attached to the gypsum board after a minimal amount of prework to the gypsum board. The gypsum board hanger provides a device which is capable of supporting an item which has a substantial weight as compared to items which have been hung by other devices.

In one form of the invention the hanger for use with gypsum boards takes the form of an attachment portion, a backing plate, a front plate and a compressing means such as a hanger-screw. Each of the plates and the attachment portion are initially flat. The front plate being pivotally connected to one end of the attachment portion; and the backing plate being pivotally connected to another end of the attachment portion. Both the front plate and backing plate have openings to through which the compressing means passes. The attachment portion includes a plurality of slots so that the hanger can be mounted on gypsum boards of different thickness.

The compressing means may take the form of any device that is capable of providing a connection between the parts and putting those parts in compression, such as a rivet, screw, bolt or any threaded connection device.

The present invention provides a hanger for gypsum board walls by compression that accommodates gypsum boards of varying thickness and which requires a minimal amount of prework so as to insert the hanger.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
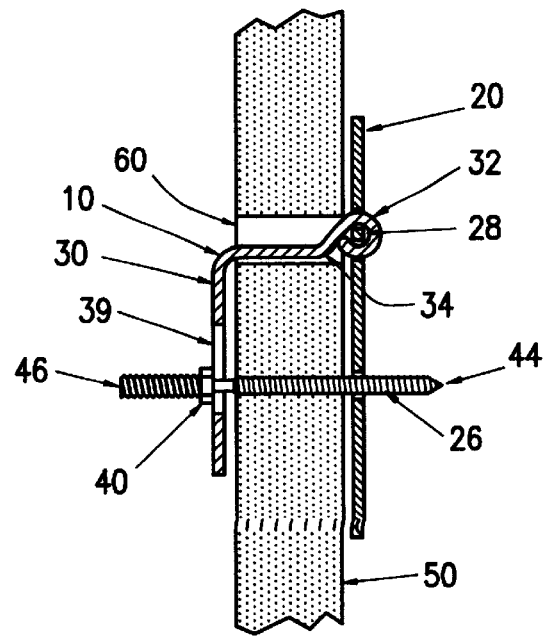
FIG. 1 is a side view of the hanger shown assembled in a gypsum board just before the hanger-screw brings the back plate, front plate and gypsum board therebetween into a state of compression.

Referring now to the drawings, wherein like reference numerals designate identical or corresponding parts throughout the several views, and more particularly to FIG. 1 thereof, a hanger 10 has been created which provides for compression of the gypsum board 50 between a backing plate 20 and a front plate 30 secured in compression by a hanger-screw 40. The embodiment of this invention is displayed in FIGS. 1–6. FIG. 1 is a side view of the hanger 10 assembled to the gypsum board 50 before the hanger-screw 40 has secured the parts in compression. FIG. 1 illustrates the hanger-slot or hanger-opening 60 in the gypsum board 50 through which the hanger 10 is inserted.

Figure 2:
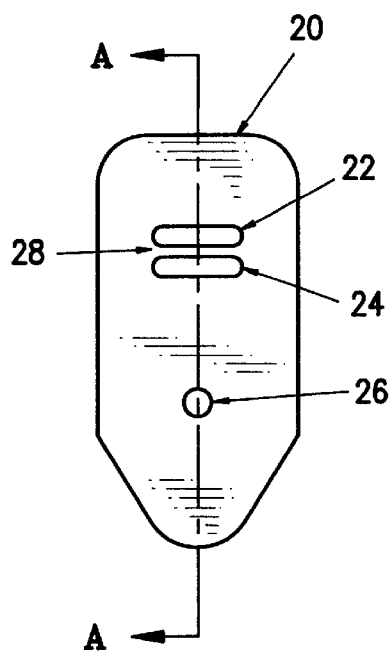
FIG. 2 is a front view of the backing plate.

FIG. 2 is a top view of the backing plate 20. Shown in FIG. 2 are attachment holes 22, 24 and pivot member 28. The backing plate 20 has a hole 26 which accommodates the hanger-screw 40.

Figure 3:
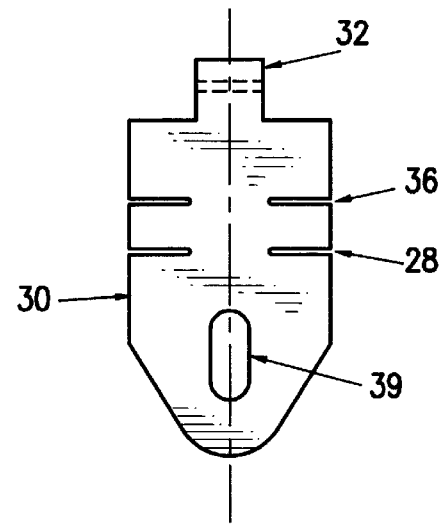
FIG. 3 is a front view of the front plate and the attachment portion before the structure it is deformed.

FIG. 3 shows the front plate 30 and the attachment portion 34. The front plate 30 has an opening 39 so as to accommodate the hanger-screw 40 and its associated stop section 42. The front plate 30 is connected to the attachment portion 34 through a joint, slot, or weakened section that bends about a preferred location. The attachment portion 34 has a hook 32 which is rotatably attached through attachment 22, 24 of the backing plate 20 and which substantially surrounds the pivot member 28 of the backing plate 20. The attachment portion 34 further has bending slots 36, 38. The bending slots 36, 38 are designed so as to accommodate standard thicknesses of gypsum board. The bending slots 36, 38 are designed so as to enable a person to bend the front plate 30 into a position as shown in FIG. 4.

Figure 4:
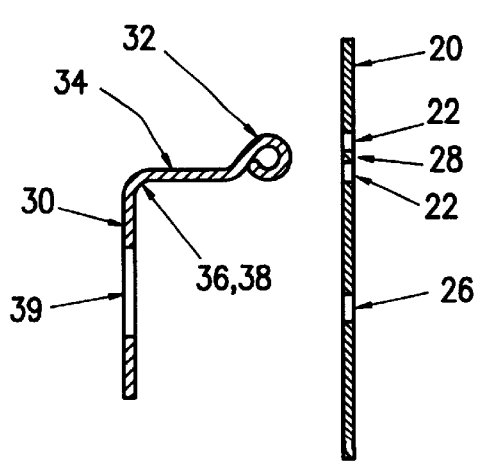
FIG. 4 is a cross-sectional view taken along line 4—4 of the backing plate and is also a cross sectional view of the front plate/attachment portion structure in the deformed position.

FIG. 4 shows a cross-section of the front plate 30, attachment portion 34, and the backing plate 20. The attachment portion 34 is shown bent about either one of the bending slots 36 or 38. Please note, however, that the front plate 30 connected to the attachment portion 34 would never be bent before it is installed in the gypsum board 50. FIG. 4 further shows a cross-section of the backing plate 20 which displays the hanger-screw hole 26 and the pivot member 28 along with its associated attachment holes 22, 24.

Figure 5:
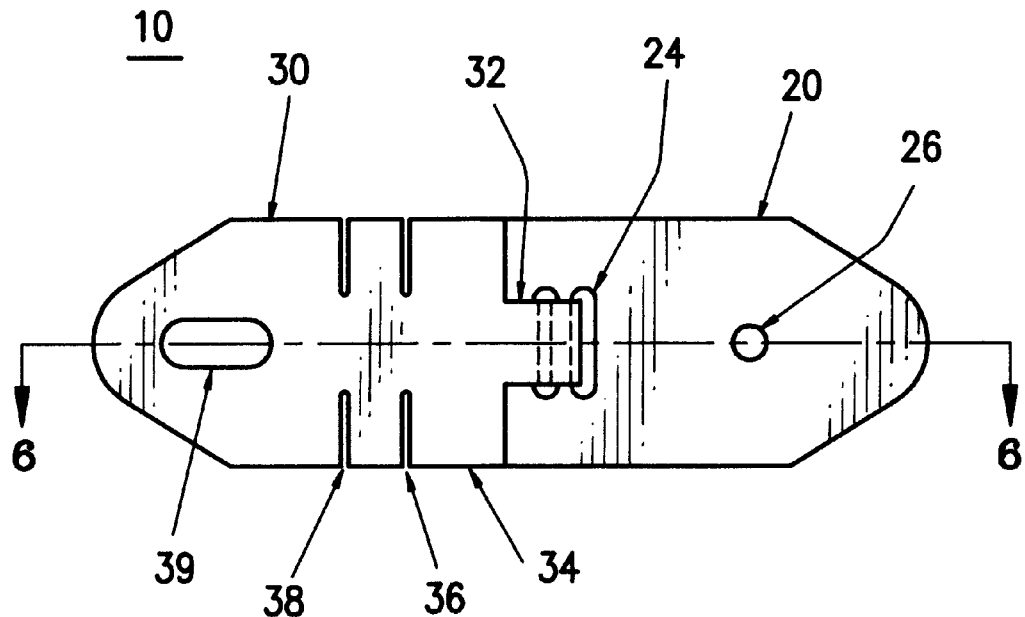
FIG. 5 is a bottom view of the front plate/attachment portion structure attached to the backing plate before the combination of parts is inserted and assembled to the gypsum board.

FIG. 5 is a bottom view of the hanger 10 before it is inserted into the hanger opening 60 of the gypsum board 50.

Figure 6:
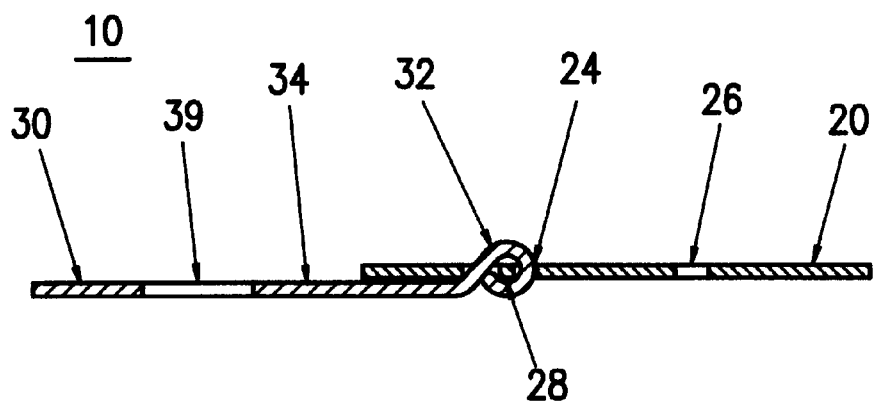
FIG. 6 is a cross-sectional view taken along line 6—6 of FIG. 5.

FIG. 6 is a cross-sectional view of the hanger 10 as it would look before it is installed in the gypsum board 50.

In use the gypsum board 50 is perforated with a sharp object so as to create the hanger opening 60. The hanger opening 60 is at least equal in size to the measurement of the hanger 10. The right hand side of the hanger 10 as shown in FIGS. 5 and 6 is then introduced into the hanger opening 60 of the gypsum board 50. The hanger 10 is introduced into the hanger opening 60 until the hanger 10 has reached a point where the backing plate 20 is able to rotate approximately perpendicular to the attachment portion 34. Then the front plate 30 is pulled towards the installer or user so as to bring the backing plate 20 into contact with the back side of the gypsum board 50. At that location the appropriate bending slot 36 or 38 should be visible near the exposed surface of the gypsum board 50, depending on the thickness of the gypsum board 50. Then the front plate 30 is bent downward so that a substantial part of the front plate 30 is now approximately parallel to the gypsum board 50 and the backing plate 20 so that the hanger-screw 40 can engage attachment holes 26 and 39.

The hanger-screw 40 is then introduced into the attachment hole 39 of the front plate 30 and is screwed through the thickness of the gypsum board 50 so as to be introduced into the attachment hole 26 of the backing plate 20. The point 44 of the screw hanger 40 penetrates the gypsum board 50 and associated attachment holes 26, 39. The head 46 of the hanger-screw 40 is the end thereof at which the hanger-screw 40 is driven. The hanger-screw 40 is introduced into and through the components until the stop portion 42 of the hanger-screw 40 abuts the opening 39 of the front plate 30 and the desired amount of torque is applied to the device so as to place the hanger 10 and the gypsum board 50 in a state of compression.

The item to be hung can now be mounted on the protruding portion of the hanger-screw 40.

Thus the hanger 10 covers a much greater area of the flat surface of the gypsum board 50 in comparison to other similar products so as to securely hold items of various weights without tearing the gypsum board 50.

In practice, the hanger 10 has held objects of 40 pounds on a gypsum board having a thickness of $7/8$ of an inch without causing any damage. The approximate size of the backing plate 30 is one inch wide, two inches long and is approximately $1/16$ of an inch thick. The front plate 30/attachment portion 34 structure is of approximately a similar size. The front plate 30, attachment portion 34 and the backing plate 20 are made of galvanized steel. Likewise, the hanger screw 40 is made of steel.

The hanger 10 may be installed in a gypsum board in which the attachment portion 34 of the front plate 30 is oriented either perpendicular, parallel or situated at any angle relative to a ground surface or floor. That is, the hanger 10 can hold the weight of an object in any direction.

Depending on the size of the object to be hung, various sizes of hangers 10 are available to accomplish the goal.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hanger to be mounted to a wall of a predetermined maximum thickness, comprising:

an attachment portion having a dimension in a first direction which is adapted to be greater than said predetermined maximum thickness of the wall;

a backing plate pivotally connected to one end of the attachment portion about a first axis substantially perpendicular to the first direction so that, in use, the backing plate may be pivoted with respect to the attachment portion to form a substantially planar structure with which the backing plate may be passed through an opening in the wall from one side to an opposite side and then pivoted downwardly relative to the attachment portion;

a front plate connected to an opposite end of the attachment portion for displacement relative to the attachment portion about an axis substantially parallel to the first axis, so that the front plate may be displaced with respect to the attachment portion such that the front plate is oriented substantially parallel to backing plate on opposite sides of the wall with the attachment portion extending therebetween through the opening in the wall; and a compressing means which is connectable to the backing plate through the front plate only when the backing plate and the front plate are oriented substantially parallel to one another, for pressing of the backing plate and the front plate against opposite surfaces of the wall, in use;

wherein each of said backing plate and said front plate has a receiver for the compressing means, the receiver on the front plate being in alignment with the receiver in the backing plate only when the backing plate and the front plate are oriented substantially parallel to one another, said backing plate being pivotable into said substantially parallel orientation without use of said compression means, so that, in use, the compressing means passes through the receiver on the front plate into engagement with the receiver in the backing plated after the backing plate and front plate are in substantial parallel orientation for producing said pressing of the backing plate and the front plate against the opposite surfaces of the wall; and wherein a hanging element for hanging of an object on the hanger projects away from said front plate.

2. A hanger according to claim 1, wherein said compressing means comprises a screw.

3. A hanger according to claim 2, wherein said screw is threadedly engaged to said backing plate in use.

4. A hanger according to claim 3, wherein said screw has a stop section.

5. A hanger according to claim 4, wherein said stop section of said screw abuts a screw hole of said front plate.

6. A hanger according to claim 2, wherein said screw has a stop section.

7. A hanger according to claim 6, wherein said stop section of said screw abuts a screw hole of said front plate.

8. A hanger according to claim 1, wherein the pivot connection between the backing plate and the attachment portion comprises a hinge.

9. A hanger to be mounted to a wall of a predetermined maximum thickness, comprising:

an attachment portion having a dimension in a first direction which is adapted to be greater than said predetermined maximum thickness of the wall;

a backing plate pivotally connected to one end of the attachment portion about a first axis substantially perpendicular to the first direction so that, in use, the backing plate may be pivoted with respect to the attachment portion to form a substantially planar structure with which the backing plate may be passed through an opening in the wall from one side to an opposite side and then pivoted downwardly relative to the attachment portion;

a front plate connected to an opposite end of the attachment portion for displacement relative to the attachment portion about an axis substantially parallel to the first axis, so that the front plate may be displaced with respect to the attachment portion such that the front plate is oriented substantially parallel to backing plate on opposite sides of the wall with the attachment portion extending therebetween through the opening in the wall, in use; and a compressing means which is connectable to the backing plate through the front plate when the backing plate and the front plate are oriented substantially parallel to one another, for pressing of the backing plate and the front plate against opposite surfaces of the wall in use;

wherein each of said backing plate and said front plate has a receiver for the compressing means, the receiver on the front plate being in alignment with the receiver in the backing plate when the backing plate and the front plate are oriented substantially parallel to one another, so that, in use, the compressing means passes through the receiver on the front plate into engagement with the receiver in the backing plated for producing said pressing of the backing plate and the front plate against the opposite surfaces of the wall; and wherein the receiver of the backing plate is located in a central portion thereof below the pivot connection between the backing plate and the attachment portion.

10. A hanger according to claim 9, wherein the axis about which the front plate is displaceable relative to the attachment portion is shiftable for varying the length of the attachment portion in accordance with the thickness of the wall through which the attachment portion is to extend in use.

11. A hanger according to claim 10, wherein the receiver of the front plate is an opening that is vertically elongated relative to the receiver of the backing plate for enabling the compression means to pass through the receiver of the front plate and engage the receiver of the backing plate irrespective of the location of the axis about which the front plate is displaceable.

12. A hanger according to claim 10, wherein the connection between the front plate and the attachment portion comprises a weakened section having slots which allow bending about at least two predetermined locations.

13. A hanger according to claim 12, wherein said compressing means has a screw thread which is engageable within the receiver of the backing plate.

14. A hanger according to claim 12, wherein said compressing means has a stop section which is engageable on the front plate.

15. A hanger to be mounted to a wall of a predetermined maximum thickness, comprising:

an attachment portion having a dimension in a first direction which is adapted to be greater than said predetermined maximum thickness of the wall;

a backing plate pivotally connected to one end of the attachment portion about a first axis substantially perpendicular to the first direction so that, in use, the backing plate may be pivoted with respect to the attachment portion to form a substantially planar structure with which the backing plate may be passed through an opening in the wall from one side to an opposite side and then pivoted downwardly relative to the attachment portion;

a front plate connected to an opposite end of the attachment portion for displacement relative to the attachment portion about an axis substantially parallel to the first axis, so that the front plate may be displaced with respect to the attachment portion such that the front plate is oriented substantially parallel to the backing plate on opposite sides of the wall with the attachment portion extending therebetween through the opening in the wall, in use;

a compressing means which is connectable to the backing plate through the front plate when the backing plate and the front plate are oriented substantially parallel to one another, for pressing of the backing plate and the front plate against opposite surfaces of the wall, in use; and wherein each of said backing plate and said front plate has a receiver for the compressing means, the receiver on the front plate being in alignment with the receiver in the backing plate when the backing plate and the front plate are oriented substantially parallel to one another, so that, in use, the compressing means passes through the receiver on the front plate into engagement with the receiver in the backing plated for producing said pressing of the backing plate and the front plate against the opposite surfaces of the wall; and wherein the connection between the front plate and the attachment portion comprises a weakened section having slots which allow bending about at least one predetermined location.

* * * * *